(12) United States Patent
Campbell et al.

(10) Patent No.: US 8,352,717 B2
(45) Date of Patent: Jan. 8, 2013

(54) RECOVERY SYSTEM USING SELECTABLE AND CONFIGURABLE SNAPSHOTS

(75) Inventors: Robert Lloyd Campbell, Nevada City, CA (US); Gregory Todd Lear, Sparks, NV (US)

(73) Assignee: CS-Solutions, Inc., Nevada City, CA (US)

( * ) Notice: Subject to any disclaimer, the term of this patent is extended or adjusted under 35 U.S.C. 154(b) by 887 days.

(21) Appl. No.: 12/368,191

(22) Filed: Feb. 9, 2009

(65) Prior Publication Data

US 2010/0205421 A1 Aug. 12, 2010

(51) Int. Cl.
*G06F 9/00* (2006.01)
*G06F 15/177* (2006.01)

(52) U.S. Cl. .......................................... 713/2
(58) Field of Classification Search .................. 713/2
See application file for complete search history.

(56) References Cited

U.S. PATENT DOCUMENTS

| | | | | |
|---|---|---|---|---|
| 7,024,549 B1* | 4/2006 | Luu et al. | | 713/2 |
| 7,546,449 B2* | 6/2009 | Wu | | 713/2 |
| 7,627,745 B2* | 12/2009 | Martinez et al. | | 713/2 |
| 7,966,602 B1* | 6/2011 | Webster et al. | | 717/114 |
| 2005/0039076 A1* | 2/2005 | Shoam | | 714/20 |
| 2005/0066037 A1* | 3/2005 | Song et al. | | 709/227 |
| 2005/0289533 A1* | 12/2005 | Wang et al. | | 717/168 |
| 2006/0064688 A1* | 3/2006 | Tseng | | 718/1 |

OTHER PUBLICATIONS

Puppy Linux 2.14 manual, Feb. 2007, Puppy Linux community.*

* cited by examiner

*Primary Examiner* — Thomas Lee
*Assistant Examiner* — Xuxing Chen
(74) *Attorney, Agent, or Firm* — Blakely Sokoloff Taylor & Zafman LLP

(57) ABSTRACT

A recovery system for a computer operating system and applications is described which uses selectable and configurable snapshots. In one example, a start-up sequence of the computer system is initiated, a plurality of snapshots in a hidden section of a mass storage device are identified before loading an operating system for the computer system, each snapshot containing an operating system, applications, and computer system configuration settings. One of the plurality of snapshots is booted including loading the operating system and applications of the one snapshot, and the start-up sequence is completed.

21 Claims, 7 Drawing Sheets

RECOVERY SYSTEM USING SELECTABLE AND CONFIGURABLE SNAPSHOTS

BACKGROUND

Field

The present invention relates to the field of computer system recovery and, in particular, to recovering a computer system to a previous state using interception in a master boot record or boot sectors.

Computer systems are subject to a variety of different malware, such as viruses, spyware, rootkits, and Internet bots, that can interfere with the normal intended operation of the system. Additional problems may be caused by user installed software or configuration settings. In the Microsoft Windows® operating systems and similar operating systems, the registry can become corrupted causing programs to load improperly or sometimes fail.

Solutions to these problems include scanning software, repair software and completely erasing and reloading the system memory. All of these solutions are time consuming and may require special expertise beyond that of a typical computer system user.

In a time critical application, the delays required to repair an infected or corrupted computer system may be very expensive.

BRIEF DESCRIPTION OF THE DRAWINGS

The invention may be more fully appreciated in connection with the following detailed description taken in conjunction with the accompanying drawings, in which like reference numerals refer to corresponding parts throughout the several views of the drawings, and in which.

DETAILED DESCRIPTION

Figure 1:
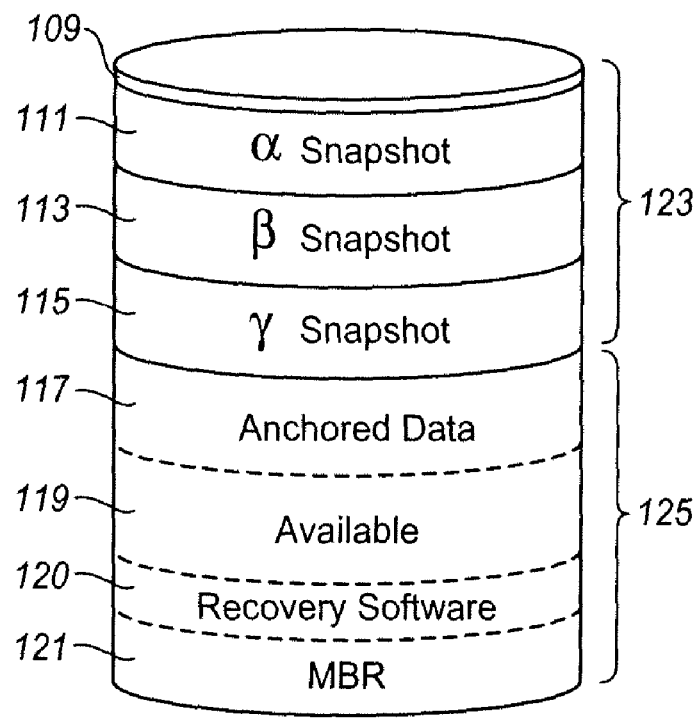
FIG. 1 is a diagram of a mass storage device configuration suitable for use with an embodiment of the invention.

Embodiments of the present invention allow a computer system to be restored to a prior state through a simple restart. The prior state may be configured as a recent preferred state, a known valid state, a certified state, or an initial state. The restoration can occur before loading the operating system so that any changes to the operating system and any configuration files can be reversed.

In one mode, referred to herein as the freeze mode, the system boots to the same state at every reboot. The snapshot is completely independent of the last active state. The snapshot can contain any desired configuration. For example it can contain accredited application and OS layers along with current data. In the background, the previous snapshot can be entirely rewritten to include the accredited application and OS layers. This mode ensures that upon restart, malicious code is erased regardless of any antivirus definitions. The freeze mode further provides no path for internet based malicious code to re-establish a connection to the computer system because at system restart the computer is returned to its certified and accredited baseline. This leaves no residue of internet connection or vulnerabilities associated with such connections.

In the freeze mode, regardless of any user rights to modify the operating system and applications, the end user cannot install new software applications to the accredited baseline, which is safely stored away. Once a computer is restarted, every bit of the snapshot is reverted to the certified and accredited software baseline including administrator installed programs. The freeze mode can be configured so that regardless of any user rights, access to the accredited baseline is restricted by a unique password created and controlled by System Integrators (SI).

The freeze mode and unique System Integrator passwords can be used to allow a System Integrator to provide updates to the accredited software baseline. By restarting a managed computer system and entering a unique SI password, access can be granted to the accredited baseline and to the recovery system allowing the SI to disable the freeze mode. Once the freeze mode is disabled, the SI can upload any desired upgrades, updates, new applications, and security patches and then refreeze the computer system. Upon reboot, the computer system is then loaded into the new accredited baseline. This baseline, as with the previous baseline, can be restored upon any system reboot. At the same time, the SI password can be used to prevent any unauthorized changes to the baseline whether malicious or inadvertent.

The freeze mode and special SI rights can be used to re-image a computer system. In a typical information systems management environment, this may be required every three months, every year, or whenever problems are reported and can require four to twelve hours or more. With the recovery system, this same process can be done in minutes without having to completely reimage the computer system; it avoids the risk of sensitive data loss, and greatly increases the time and ease of maintaining the desired software image baseline.

In another mode, referred to herein as standard mode, the computer system operates normally unless the user initiates the re-baselining of the computer system back to a certified and approved software baseline, or back to any other previous snapshot. Allowing the user to choose when to restore the system, allows the user to load non-certified or non-accredited software applications and configuration settings and use these through many restarts. When these applications or settings are no longer wanted or when problems arise, the system can then immediately be initiated back to an earlier configuration, such as the certified and accredited software baseline.

The user can initiate the recovery system, for example, by pressing a key, for example F1, upon receiving a prompt on a boot screen. After loading a pre-OS memo for the recovery system, the user may then be given a choice of different snapshots to load or to return to normal startup. There can also be a configuration choice to allow the user to configure the recovery system. As an alternative, any configuration and snapshot choices can be restricted by an SI password.

The recovery system can allow a choice of different snapshots. Each snapshot can be an independent bootable image of the system drive. In one example, only one snapshot will be active at a time and the use and configuration of each snapshot does not affect the other snapshots. Different snapshots can contain different program applications or even different operating systems.

Snapshot groups can be used to provide different levels of password protection for different kinds of snapshots. A snapshot group can be allowed for each user or class of user. Each user or user class can also be allowed to configure its own snapshots. The groups can be independent, and allowed to overlap. Each group can be associated with a name and a password. As a result, when a user activates the recovery system on restart, the user can be presented with a choice of one or more groups. In one example, upon entering a password, a choice of different snapshots available to the authenticated user can then be presented. All other snapshots are hidden. A default group that does not have a password can also be used. In another example, the pre-boot menu initially displays all of the snapshots in a particular group, such as a default group. The user can then view and select the snapshots in one of the other groups by pressing a pre-OS menu hotkey and entering the password for that group.

The different groups can be used to restrict access not only to particular resources of the computer system, but also to restrict access to intranets and private networks. As an example, a computer system might be configured to operate on a company or group intranet and a snapshot can contain a configuration setting for use of and access to the company or group system. A snapshot with these settings can be placed in a password protected group so that unauthorized personnel cannot boot and use these settings. The snapshot allows authorized users to operate within the system with ease, but can also be used to prevent access by those who do not know the password for the password protected snapshot group.

The recovery system also allows for retaining user data. In one example, this feature can be called data anchoring. Anchored data can be made available to all snapshots. However, there can be limits to the use of the data unless the booted snapshot is configured with an appropriate application program for operating on the data. Anchoring the data can ensure that important data is not lost, even when recovering the computer system to some certified and accredited software baseline. Using the recovery system, data contained within an anchored folder or file will be available regardless of which snapshot is booted. Accordingly, it can be ignored by the recovery process. Alternatively, anchored data can be restricted to one or more particular snapshots. This incurs the risk that when a particular snapshot is corrupted, the data may be lost.

If the anchored data is available to all snapshots, in other words, if all anchored data files are made "global" to all snapshots, then the data can be retained through all recovery scenarios. Such scenarios include critical system errors that require booting to a certified state, and the installation of new upgrades, updates, and security patches.

The recovery system's ability to check passwords before loading the operating system can be used as an additional security measure. The recovery system can be configured, for example, so that at each reboot, the user must enter a password even to access a default snapshot. This password requirement provides much greater security than, for example, the one offered by the operating system or a system BIOS (Basic Input/Output System). Some password systems require boot access to the HDD (Hard Disk Drive) to initiate an attack on an OS account. The present recovery system can preempt any loaded malware that tries to attack the account by loading a certified image. Some password systems use a BIOS password or a boot password that can be enabled within the BIOS. However, these can be compromised by a BIOS flash or a BIOS reset. The recovery system, however, is not affected by changes to the BIOS. Furthermore, it does not require any changes to BIOS commands and functions.

Passwords and snapshots can be used in another way with the recovery system to allow a system to be recovered when a user forgets a user specific password, such as a password to a particular application or the operating system. In many systems, a forgotten OS password or an OS password typed incorrectly three times consecutively, for example, can prevent a user from accessing the system. This renders the system inaccessible to those who need it. This can cause delay or result in the complete loss of irreplaceable data on the computer system.

With the recovery system, the computer system can be booted to a secondary snapshot. This secondary snapshot can be configured as an exact image of the certified and accredited software baseline with its initial login credentials before the user established unique credentials. The secondary snapshot can be used to allow the user to re-establish application and OS passwords without significant delay and without restoring the computer to its original setting, losing all user data. Using anchored data files the secondary snapshot allows a user with re-established credentials access to all of the data that would have been available without the password incident.

After the user has re-established its credentials and performed any other important configuration tasks, this new configuration can be copied back to the primary snapshot. Upon the next reboot, the computer system will boot into the primary snapshot in the form to which it has been re-established. This, in effect, resets the user passwords without breaking any accreditation boundaries. In addition, this approach does not introduce any new vulnerability into the system. The secondary snapshot remains in the same protected state within the HDD rather than the OS. Access can only be granted to this or any other snapshot by successfully entering the appropriate recovery system boot password, and then by having access to the credentials for the baseline configured user for any associated OS and software program passwords. Accordingly, a two-factor authentication sequence remains in place for both snapshots.

Authentication can take many different forms. As described herein, the authentication process is simply entering a password into a keyboard at the appropriate time. However, additional or different authentication methods can be used. Biometric devices, such as fingerprint scanners can be used, time dependent rotating passwords can be used based on an auxiliary absolute time algorithm. Multiple stage password or keyword systems can be used. Hardware keys can be used, etc. The particular type and form of authentication can be adapted to suit the needs of the particular application.

FIG. 1 shows a diagram of an example configuration for a system mass storage suitable for use with the recovery system of the present invention. The mass storage may be formed from magnetic disk, solid state, magnetic cell array or any of a variety of other system mass storage technologies. For convenience it will be referred to herein as a hard disk drive or disk. The disk of FIG. 1 can be a single partition of a larger disk that has other partitions, the only partition of a disk, or a composite illustration of several disks or partitions. As illustrated, the disk contains a unique interception machine code 109.

After booting the BIOS, when the system goes to the mass storage to load the operating system, the interception machine code will intercept the boot process and direct the boot loader to an appropriate snapshot. If so configured, the interception machine can display a pre-OS menu in order to allow a user to select a recovery snapshot to boot. This will cause the recovery system to "swap" and boot to the selected operating system as described in more detail below. In other words, the interception machine code will either load a default snapshot, based on previous configuration settings, or present a user with a list of snapshots from which to select. The user selection may be controlled by authentication options in a variety of different ways as described herein.

The interception machine code is so called because it intercepts the regular boot process and diverts the process to the selection and loading of a snapshot. In the example described herein, a conventional boot process is modified by adding this code. The code can be in a variety of different locations, depending on the system configuration. For a Microsoft Windows® system, the master boot record or the boot partition are suitable locations. However, for other operating systems, other locations may be used. As an alternative, the functionality described herein may be integrated into the boot process. This can be done by replacing the standard or conventional master boot record with a different record or instructions. As a result, there may be no interception code or the interception code may be indistinguishable from the standard boot code. While the present description refers to an interception machine code, such code is not necessary to the invention. The particular implementation of the boot or startup process can be adapted to many different applications.

The disk in the illustration of FIG. 1 also shows three snapshots identified as alpha 111, beta 113, and gamma 115. The alpha snapshot is the default snapshot that will be loaded by the interception machine code on system startup. The other two snapshots may be in the same or different groups and may be controlled by the same, different, or no passwords. The disk also contains anchored data 115. The disk also contains a master boot record (MBR) 121 used in initial startup as described above. The interception machine code 109 can be integrated into the MBR or the MBR can be modified to point to the interception machine code.

The recovery system software 120 is shown separately from other applications in the snapshots. The recovery software resides on the system, common to each snapshot. The recovery software allows users and administrators to establish, manage, and maintain the snapshots and the initiation files of the recovery system. The rest of the disk is available for storage of additional data, buffering and any other purposes required or desired by the operating system.

In FIG. 1, the disk storage can be seen as logically bifurcated. There is a hidden section 123, containing the three snapshots and a visible section 125 containing the anchored data, operating system, applications and available additional space. These two sections can be in the same or different partitions and in the same or different disks. The snapshots are placed in a hidden section so that they will not be affected by malware and user actions, whether intentional or accidental. The snapshots can therefore be loaded safely no matter what has happened to the system and data in the visible section. In use, one of the snapshots, the active snapshot, will be exposed, but the other two snapshots remain hidden and protected.

The anchored data 117 is placed in the visible section 125 so that it is always available to the user. The anchored data can include a user documents folder and application data folders, for example. If the anchored data is visible then it can be maintained in its most recent condition whenever a snapshot is loaded. The anchored data can also be easily modified by the user and applications that the user runs. On the other hand, the visible data presents some measure of vulnerability if it contains latent malware. While the system can be rebooted to a safe snapshot, the snapshot may soon be adulterated by the malware latent in the still infected data. In such a situation, measures can be taken to clean up the data in a maintenance or safe mode.

While the interception machine code 109 is shown as a hidden file 123 on the disk, it may also be in the visible section depending on the demands from the BIOS or the OS. The complete recovery system high level software application 120 can be configured to run on the OS or independently of the OS. As described herein, the high level application 120 allows for great flexibility in establishing and maintaining snapshots as well as in many other functions of the recovery system.

The high level application can be used to allow users to configure and organize snapshots and their related authentication schemes. It can also be used to set data storage locations, to run update schedules for the snapshots, to set defaults and to create and remove snapshots. In one example, the high level software application also configures enables, and disables the pre-OS interception machine code.

Figure 2:
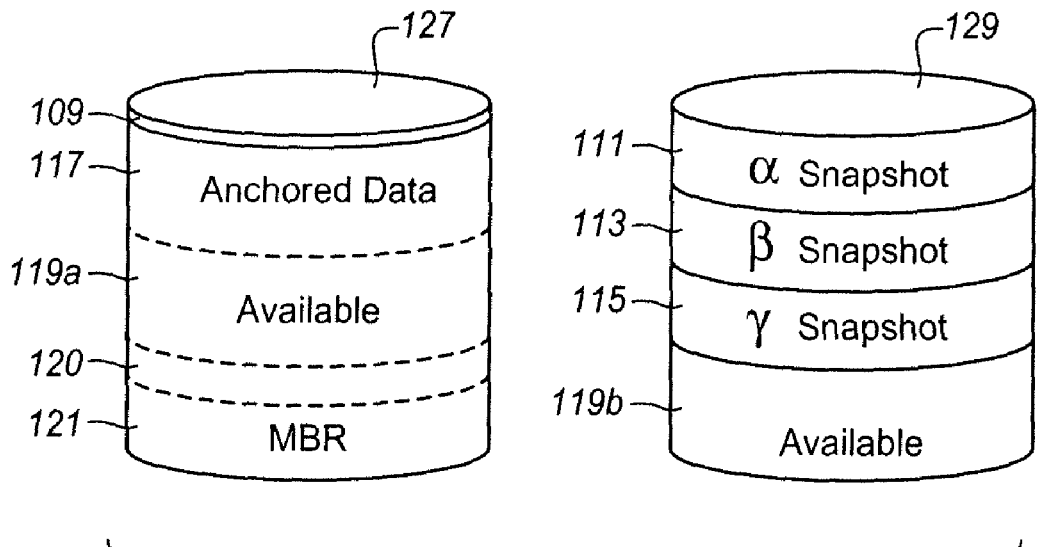
FIG. 2 is a diagram of an alternative mass storage device configuration suitable for use with an embodiment of the invention.

FIG. 2 shows an alternative configuration in which the system has two disks or other type of mass storage devices. The first disk 127 is used by the operating system and applications for temporary files and other short term purposes. In the illustrated example, it also contains the recovery system software 120, the anchored data 117, the MBR 121 and an available portion 119a. The other disk 129 contains the snapshots 111, 113, 115, and an available portion 119b. In this example, the entire second disk maybe hidden or just the portions that contain the snapshots. The anchored data, the recovery software, and the MBR may alternatively be stored in a visible section on the second disk.

This configuration provides a benefit that when a snapshot is stored or loaded it is read from one disk onto the other. This is typically faster than reading from one part of a disk and writing to another part of the same disk. Another benefit is that the snapshots are still further isolated from problems in the operating system or application that might affect the disk. In addition, if the main disk 127 fails, it can be replaced and the system restored from one of the snapshots on the secondary disk 129.

As an alternative, one or more snapshots can be stored and one disk and one or more other snapshots on the other disk. If, for example, the default active snapshot is on one disk and the baseline authenticated snapshot is on the other disk, then when the default is restored back to the baseline, copying operations will be only from one disk to the other. Similarly, in the freeze mode described herein in which there are two snapshots in primary use, putting one snapshot one each disk can speed use.

As an alternative, rather than two disks, the various files and folders can be spread over more disks. Alternatively, the two disks illustrated in FIG. 2 can instead correspond to sectors of a single disk.

Figure 3:
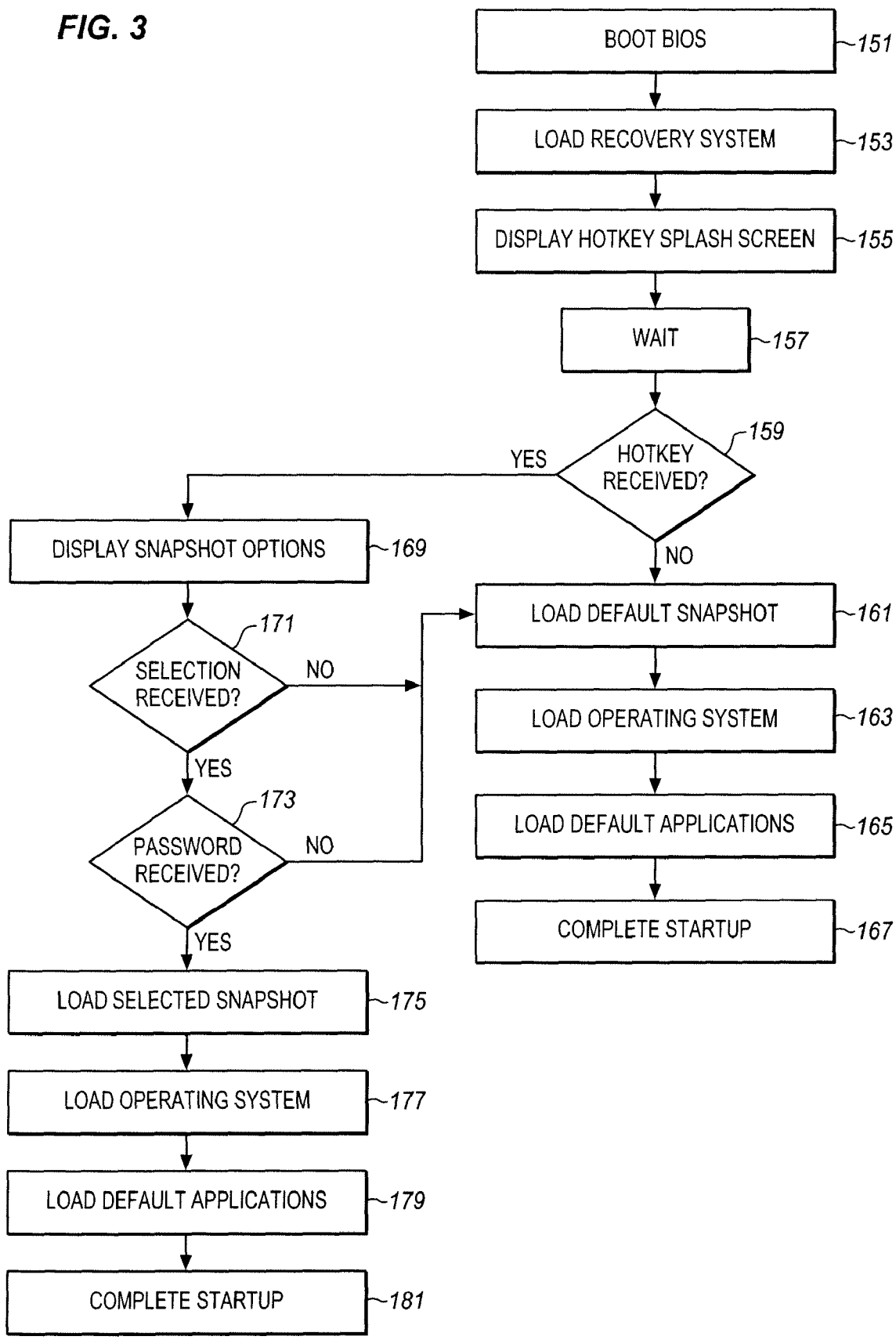
FIG. 3 is a process flow diagram of starting up a computer system according to an embodiment of the invention.

FIG. 3 provides an example of the operation of the recovery system described above. In the example of FIG. 3, the system starts by booting the BIOS at block 151. The BIOS may be booted in any of a variety of ways and any desired security measures may be taken or added to this process. In many computer systems, the BIOS is stored in ROM (read only memory) in the system and is loaded into a volatile memory, such as RAM (random access memory) for quick access. The process also typically includes some system resource tests and the discovery and initialization of any hardware assets of the system.

The BIOS loads the determined boot devices at the first bootstrap location and passes control over to the bootstrap location. For most hardware bootable devices, this is typically track 0, sector 0 and is referred to as the MBR, or Master Boot Record. The MBR will determine the logical layout of the device and the active boot partition or volume. This in turn, will continue the bootstrap loading of the operating system. In this system, however, the interception machine code is loaded (interception can occur at the MBR or a Partition Boot Record) for the recovery system at block 153.

The interception machine code will determine which snapshots have been saved to the system and any groupings and settings that might apply to the snapshots. A hotkey splash screen is displayed at block 155 which presents the user with available options. In one example, the splash screen simply allows the user to press a key, such as F1 to change the default snapshot. In another example, the user is allowed to choose between different snapshots by pressing an appropriate key for the desired snapshot.

At block 157 a wait time is counted. If no snapshot selection is made at block 159, then at block 161, the default snapshot is loaded. Any snapshot will include a version of the operating system files and these will be loaded at block 163. Loading the operating system may require the user to enter a password and take other actions, depending upon how the operating system is configured. At block 165, the default applications are loaded including any user authentication and passwords and at block 169, startup is completed.

The completion of startup can include a variety of additional actions, such as authenticating with servers or virtual networks, authenticating the user to particular databases, information sources, e-mail or other communication accounts, etc. For higher security, all of the operating system and application files are included in the snapshot. Each snapshot will have its own copy of these files. The user can be allowed to select specifically which files are in each snapshot. Some applications, for example, include extensive template and graphics files. These files can be excluded and then loaded from a visible shared area, if desired.

To further reduce the size of the snapshot, some of the application files may be loaded from general shared files in a visible part of the disk. The system can be configured so that application files for applications that are more subject to security risks, such as those that modify data or enable macros are saved in a snapshot, while application files for less dangerous applications, such as readers and viewers can be stored in more vulnerable locations. The high level recovery software can be configured to allow for many different options in maintaining and managing the snapshots.

As another alternative, the operations of block 155, 157, and 159 can be disabled, so that no user options are displayed. This corresponds to the freeze mode described above. In such a case, the system will also load the default snapshot. In this example, only an SI or other specially authenticated user can select or set another snapshot. As a further alternative, all of the options of blocks 155, 157 and 159 can be disabled subject to certain conditions. For example, the BIOS or another system resource can be configured to require administrator authentication before the administrator is allowed to select any snapshot other than the default snapshot.

Alternatively, a modified version of the standard mode can be used. In this example, the user may be able to enter a key or key combination to access snapshot choices, but this option can be concealed by displaying a BIOS or some other screen while waiting at block 157 for a key input from the user. This configuration encourages that the default snapshot be loaded.

At block 169, if a hot key is received, then the various different possible snapshot options can be displayed to the user. In the example of FIG. 1, the display can indicate that there are three available snapshots, alpha, beta, and gamma. A description of each can also be displayed to help the user to make a selection. So, for example, alpha can be indicated as the default, beta can be indicated as an administrator and gamma can be indicated as being for a special purpose.

At block 171 a selection of one of the snapshots is received from the user. If no selection is received, then the process can go to block 161 and load the default snapshot and corresponding files. At block 173, if the selected snapshot requires a password, then the password is received. If the user selects a password protected snapshot but does not enter the password, then, as with no selection, the process can go to block 161 to load the default snapshot.

If a password is entered for the selected snapshot, then at block 175, the selected snapshot is loaded. This is followed by loading the operating system at block 177, including any necessary authentication. The applications are loaded at block 179 and at block 181, the startup is completed with any other operations as may be required or desired, depending on the particular communications, authentication, hardware and operating system configuration.

Alternatively, block 173 can be positioned ahead of block 169. In this example, the user is prompted to enter a password or other type of authentication. If the password is accepted, then the snapshot options are displayed to the user. If a selection is received, then the system continues starting as before. This alternative conceals information about snapshots from unauthorized users.

If the snapshots are organized into groups, then the snapshots display at block 169 can be further restricted to those available to that user. For example, if a user has one password and an administrator has another password, then there can be an administrator snapshot that is concealed from the user after the user enters a password. The administrator snapshot and all of the other snapshots, however, can be displayed to the administrator.

If there is also a guest password for authorized guests, a different snapshot that conceals the regular users special applications and data can be displayed to the guest, while all of the other snapshots are concealed. In another alternative, depending on the password, there may be no snapshots displayed. Instead the system can boot directly to a designated snapshot for that group of users. Such an approach can be used to limit the choices for users or guest, while still allowing more options for administrators or other super users.

As can be seen in FIG. 3, the recovery system allows for multiple levels of security. Authentication can be required for the BIOS, the recovery system, the operating system, communications access and particular applications. The additional level of security afforded by the recovery system makes the system secure even if all of the other security measures are thwarted. In addition, all of the files necessary to start the system remain hidden until the required authentication is provided.

Figure 4:
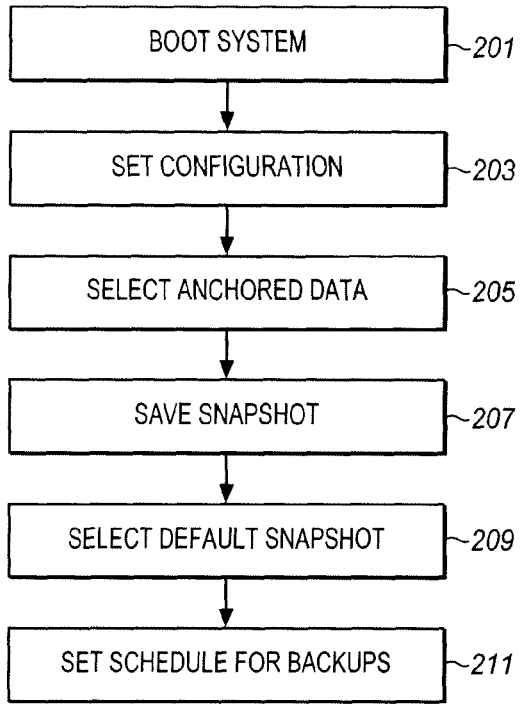
FIG. 4 is a process flow diagram of configuring a computer system for startup according to an embodiment of the invention.

FIG. 4 shows configuration options that may be offered using the recovery system. While these operations are shown in a particular sequential order, the operations can be performed in other orders, the operations can be fully or partially automated, some of the operations can be deleted and others can be added.

At block 201, the system is booted, including the operating system. The recovery system high level software is then installed, if it has not been already. Starting at block 203, the user begins a process of creating a snapshot. In the illustrated example, the user sets the configuration of the machine at block 203. This can include installing any desired software at the desired version, obtaining any updates or upgrades, configuring user settings for the applications and setting user options both for the applications and the operating system. The settings can include programs that run at startup, icons that appear in the notification area, desktop backgrounds and colors, power schemes, sound schemes, enabled and disabled hardware settings, device drivers and any other user configurable settings. These settings then become the basis for the snapshot. Different users, for example, can establish different snapshots that are configured to best meet the needs of each user. Different snapshots can also be configured to support different task or workflow scenarios.

At block 205, the user selects the data that will be anchored by the recovery system. Embodiments of the present invention provide two different ways to preserve user data. First any user data can be made part of a snapshot. This has the advantage of protecting it in a hidden portion of the disk. However, it can only be accessed when that snapshot is active. A second option is to designate the data as anchored data. Anchored data is available in a visible part of the disk to all snapshots. This allows any changes to the data to be maintained and available when a different snapshot is loaded. A third option is to make no special designation of the data and allow it to reside in its normal location. Any other data backup and security system can also be used for user data, including remote storage.

At block 207, having set a desired configuration and designated which data is to be anchored, the user saves the snapshot. The snapshot can be named and a description of the snapshot can be provided that is displayed on the snapshot options display and with other user interfaces. Authentication requirements can also be set for this particular snapshot.

At block 209, the default snapshot is designated. The user can select the newly saved snapshot as the default, or another snapshot, depending on the nature of the snapshots and the expected uses of the system. For a managed system, the SI can set the default snapshot and lock out any further changes by unauthorized users.

At block 211, a schedule is selected for the snapshot. The schedule determines when the snapshot is updated. For general computer usage, the snapshot can be automatically updated weekly or monthly. This allows any software updates and significant user changes to be updated as well. However, if during the time between snapshot updates, the system is corrupted, these will not be saved to the snapshot. Accordingly, frequent updates render the snapshot less secure. Infrequent updates are less able to capture user changes and system upgrades over time. However, since the anchored data is not part of the snapshot, infrequent updates do not affect whether recent data changes are available to the snapshot.

In some cases, it may be preferred to schedule no updates. A snapshot can be used to preserve a known working state of the machine before a significant software change, for example installing a new service pack or upgrading to a new version of an application. If the software change introduces issues or errors, then the earlier saved snapshot can be used to revert back to the previous configuration. In another example, a snapshot can be used to save an accredited baseline configuration. If the system is later corrupted or modified, the accredited baseline configuration can be restored using the snapshot. Such a snapshot can be used not only for security but to allow a system to be moved to a new user. After the prior user returns the system, user data can be deleted and the system started up to the baseline configuration. Any other snapshots can then be deleted and, if desired, a new snapshot can be created for the new user using a process like that of FIG. 4.

Figure 5:
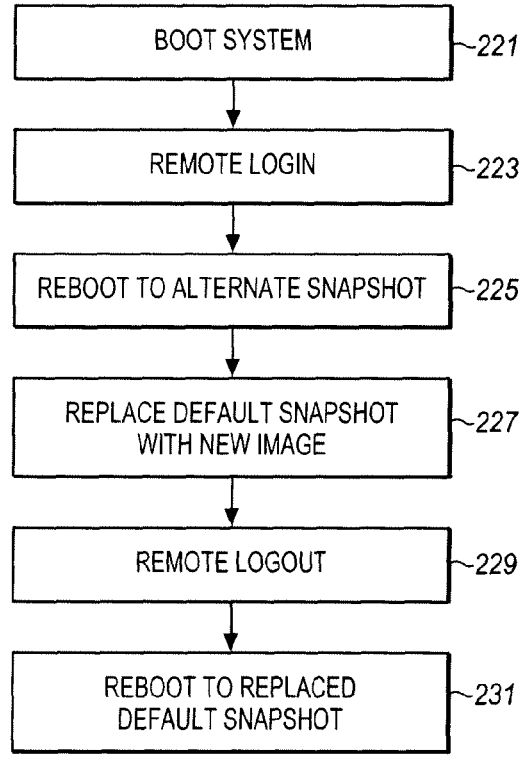
FIG. 5 is a process flow diagram of reconfiguring a computer system according to an embodiment of the invention.

FIG. 5 shows additional uses for snapshots for System Integrators or similar information technology staff. At block 221, the system is booted and at block 223, the SI logs on remotely. Alternatively, this could be a local logon. At block 225, having obtained access to the system, the SI can boot to another snapshot. This allow the current snapshot to be modified. The other snapshot can be a snapshot that has been optimized for remote access or for system repair and diagnostics. Alternatively, the other snapshot can be the latest alternative to the default snapshot. At block 227, the default snapshot is replaced with a new image. At block 229, the SI logs out and at block 231, the system is rebooted to the new image.

Such a process allows the SI to remotely apply upgrades, updates, configuration changes, licensing changes and any other modifications very quickly. A new image can be prepared at the SI facilities and then distributed to all users using snapshots. A machine with only two snapshots, a default and an administrator snapshot can be quickly updated or modified by simply replacing an old default snapshot with a new one. A similar process can be used to add new capabilities, support additional users, and for many other purposes. The process can be done remotely or locally, depending upon the capabilities of the particular machine and network facilities.

Figure 6:
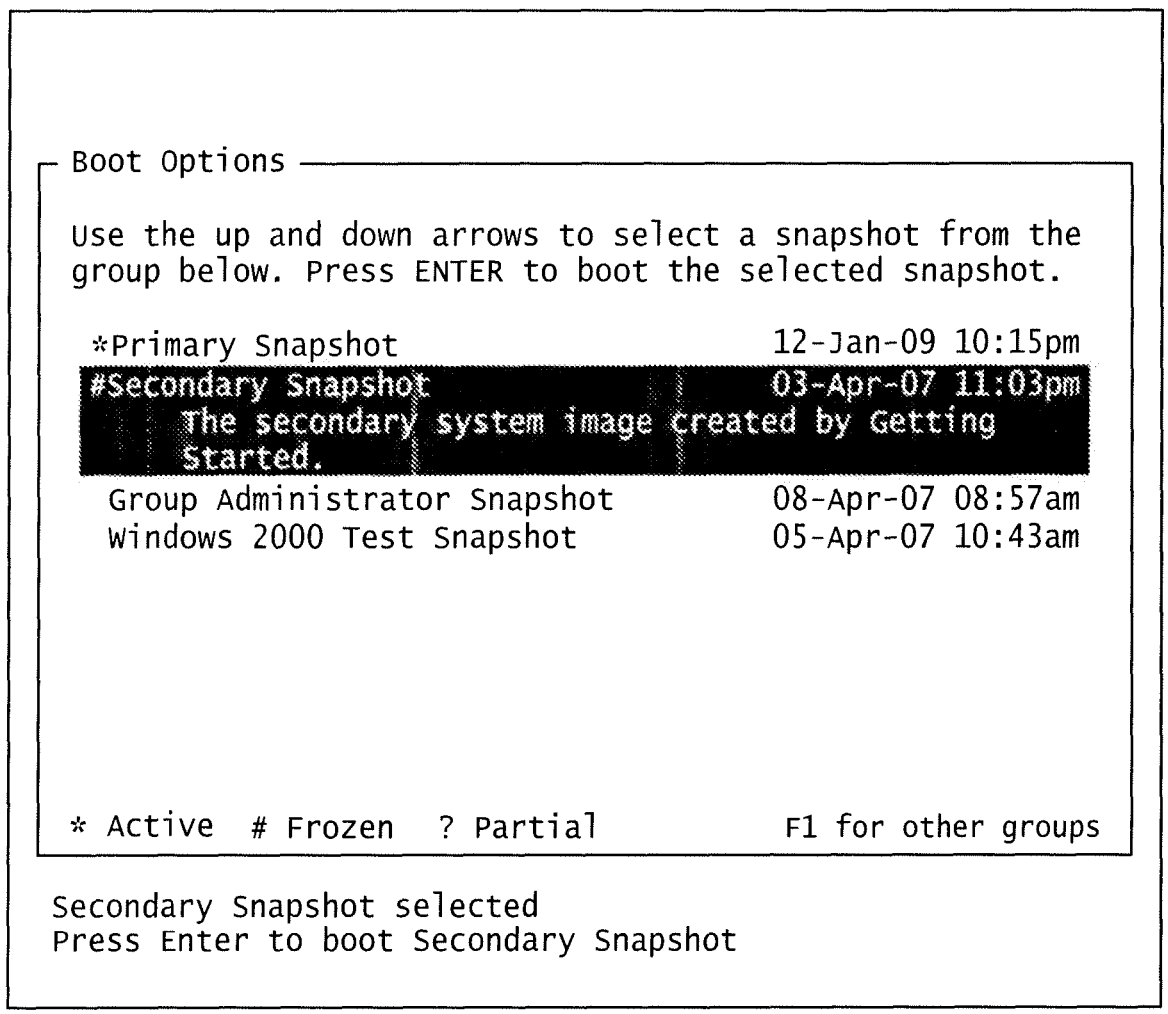
FIG. 6 is an example screen display for use in starting up a computer system according to an embodiment of the invention.

FIG. 6 shows an example of the hotkey splash screen display mentioned in the context of block 155 of FIG. 3. Such a display can be set to appear automatically, in response to a user action, such as pressing F1, or in response to an administrator access. The display shows a choice of four different snapshots, primary, secondary, group administrator, and Windows 2000 test. With each snapshot there is a date and time display for the last update and, if the snapshot is selected using arrow keys, then there is a description of the snapshot. The description is intended to help a user in making a selection. In this example, the user is invited to highlight one of the snapshots using the arrow keys and the press Enter. The choice can be made in a variety of different ways, depending on the particular application and computer system capabilities.

The display also provides additional information about each snapshot with special characters. In this example, "*" indicates the snapshot that is active. "#" indicates the snapshot that is frozen and "?" indicates partial or questionable snapshots. The active snapshot is the one that will be booted into normally in the default mode if no choices are made. The frozen snapshot is a secondary image that is not changed.

In a typical usage scenario, a user will be restricted to the primary and secondary snapshot. The group administrator and test snapshots will be reserved for administrator use. The display of FIG. 6 can be used after receiving an administrator password. In response to a user password only the primary and secondary snapshots are displayed in a typical usage scenario.

The present invention provides flexibility to create and operate in a variety of different operational modes. In one mode, a standard mode, the interruption machine code has a default snapshot. Each time the system is started, it bots into the default or primary snapshot. In this mode, if there is a system error or other problem, then the system is restarted. At the appropriate time, the user invokes the snapshot selection splash screen and selects an alternative, or secondary snapshot and boots into the alternative snapshot. Any errors in the primary snapshot are avoided by using the secondary snapshot.

This standard mode can operate with or without user authentication. It can also operate with or without displaying the snapshot selection splash screen. The standard mode can also operate so that the splash screen is displayed only if the user enters a hotkey and provides authentication to allow access to the snapshot options.

The primary snapshot can be replaced or repaired using any of a variety of tools or approaches. Using the recovery system described herein, the primary snapshot can be replaced locally or remotely with a new certified primary snapshot while the system is operating with the secondary snapshot. Such a replacement snapshot can be stored locally or remotely in a variety of different forms and formats. The snapshots can be compressed, encrypted, and hidden.

An additional feature that can be provided using the recovery system is a revert option, an option to revert the default snapshot back to another snapshot. If there are three snapshots on the system, as shown for example in FIG. 1, the user can boot into the secondary snapshot (beta), after the primary snapshot (alpha) is corrupted. The primary snapshot can then be reverted to the form of the tertiary snapshot (gamma), while the secondary snapshot is being used. The reversion process can be performed by a simple copy operation or by comparing each of the files and replacing only those that have changed with the corresponding file in the reference snapshot. In either case, the registry is typically replaced.

The tertiary snapshot can be a reference snapshot or a baseline snapshot. The reversion can be done by the high level software or in a variety of other ways. After this is done, the system can be restarted back into the primary snapshot, protecting the secondary and tertiary snapshots. As an alternative, the secondary snapshot can be used to restore the primary snapshot. This avoids the need for the tertiary snapshot, however, there can be difficulties in copying operating system files that are in use, depending on the operating system.

To make the revert option easier for an end user, it can be automated. When the user reboots into the secondary snapshot, the user can be prompted to decide whether it wants to restore the primary snapshot. If so, then the recovery system can disable the user interface, boot into the secondary snapshot, restore the primary snapshot, and reboot into the primary snapshot, with restored user interface, all without user intervention. This process can all be managed by the high level software or by another entity. The baseline with which to restore the primary snapshot, the snapshot to be used as default, the required authentication and other options can all be made selectable options in the high level software.

In a second mode, a freeze mode, a backup snapshot can be used to automatically restore the system to a certified state with every reboot. In one example, the system has a primary snapshot and a secondary snapshot. Each time, the system reboots it boots into the other of the two snapshots. So, for example, if the system is operating in the primary snapshot and is rebooted, then it automatically boots into the secondary snapshot. Similarly, if it is operating in the secondary snapshot, it automatically reboots into the primary snapshot. In addition, each time the system reboots, there is a reversion. The files from the active snapshot are used to restore the alternative snapshot.

In the freeze mode, immediately after booting, the two snapshots are identical and any changes since the last boot are eliminated. All personalization, user options, registry changes, etc. are erased and replaced with the previous snapshot. User data that has been anchored is unaffected. So for example, if favorites or bookmarks for an internet browser were stored in the snapshot, they will be deleted and replaced with the originals. If they were stored as anchored data, then they will remain.

The freeze mode provides the benefit that the configuration of the machine is always returned to its original state after each reboot. This prevents any user or outside behavior from changing the configuration of the machine. The freeze mode is useful for secure installations, for computers that have frequent guest users, and for computers that might frequently get re-assigned to different users. It can also be useful for users that are inclined to install additional software or make extensive personalization.

A machine operating in freeze mode can also contain a baseline snapshot. The baseline can be used to restore the machine to a reference baseline the primary and secondary snapshots are corrupted. It can also be used to deploy upgrades, updates, and new images. An administrator can boot into one of the freeze mode snapshots (primary or secondary) and then replace the reference baseline snapshot. This can be copied into the inactive freeze mode snapshot replacing it with the new baseline or reference. When the system is rebooted again it will boot into the new freeze mode baseline. As a consequence of the freeze mode operation, it will then also replace the other inactive freeze mode snapshot with itself, eliminating the last copy of the older configuration.

Figure 7:
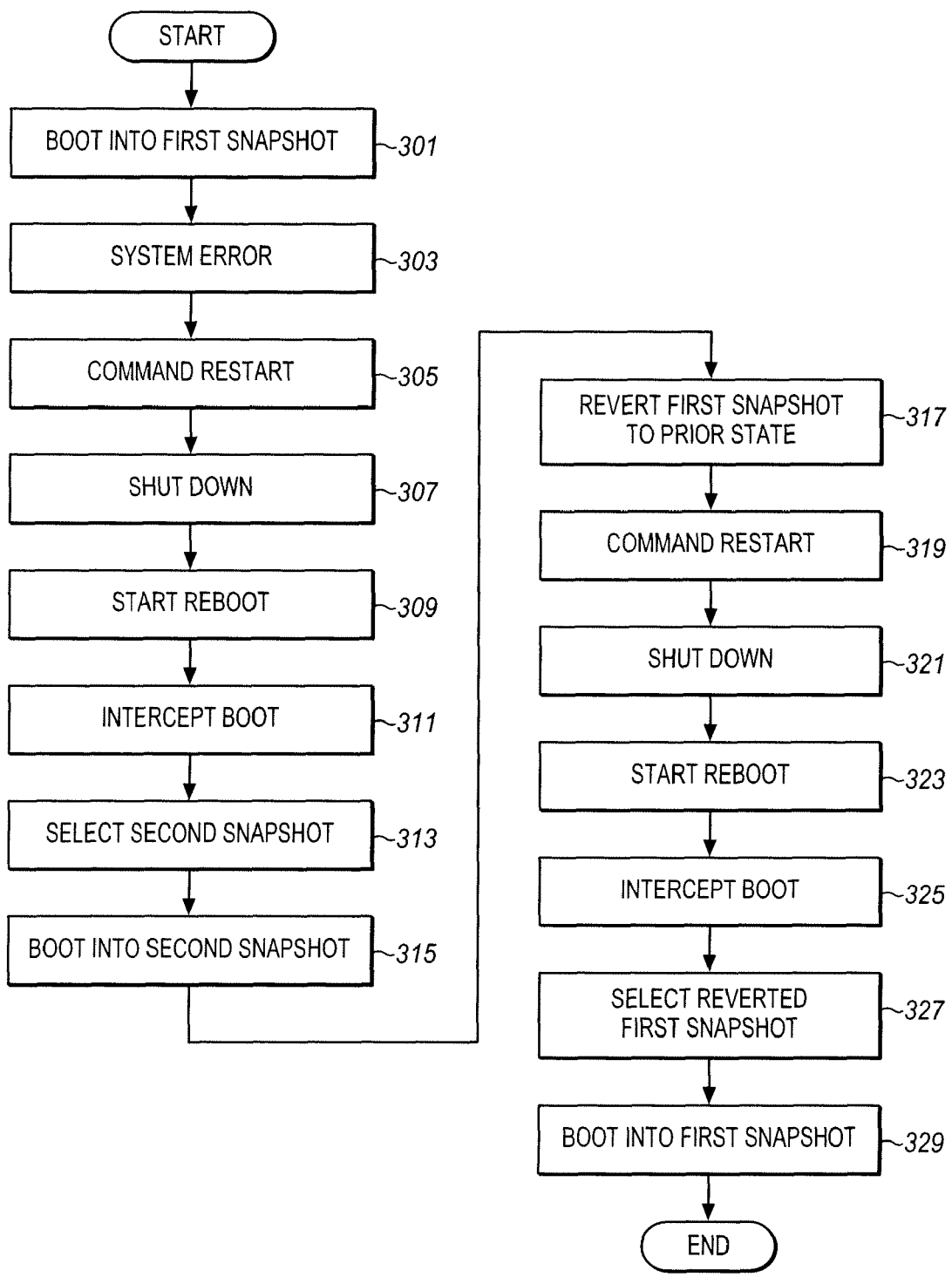
FIG. 7 is a process flow diagram of restarting a computer system according to one mode of an embodiment of the invention.
Figure 8:
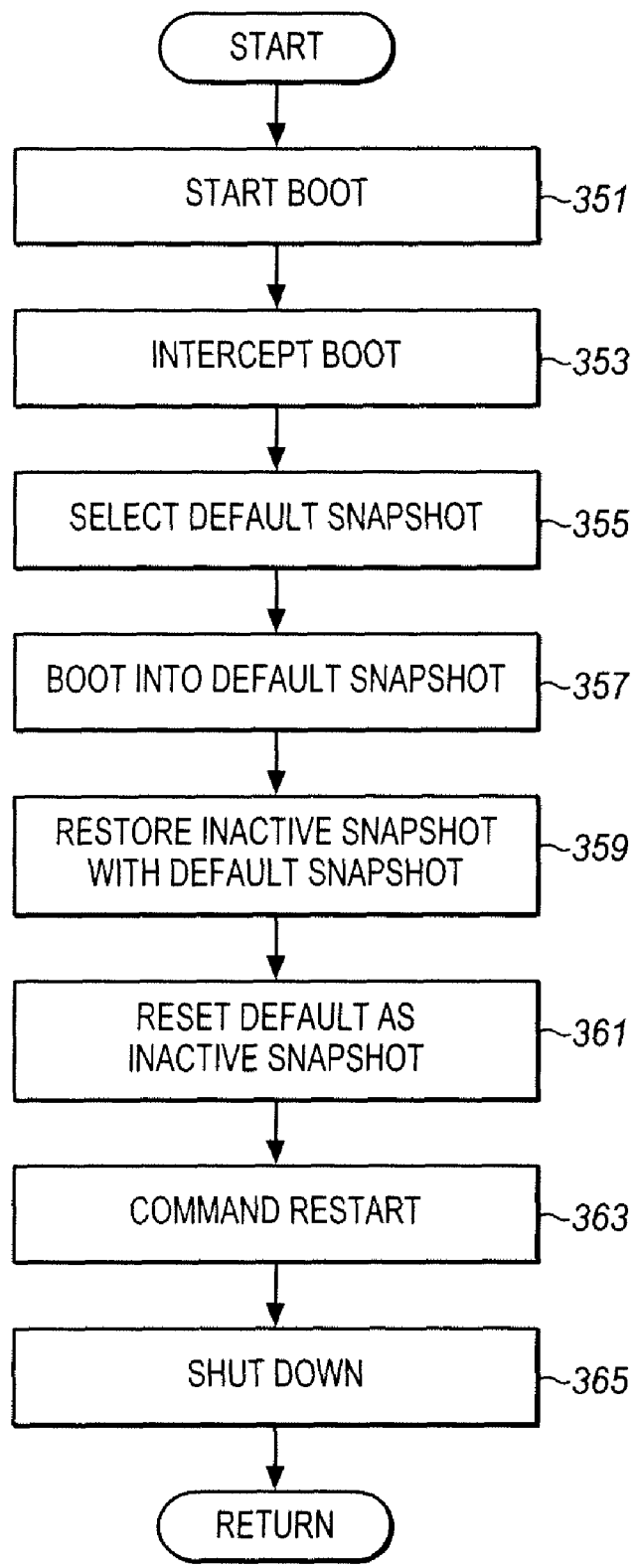
FIG. 8 is a process flow diagram of starting up a computer system according to another mode of an embodiment of the invention.

The usage scenarios described above can be illustrated in part by the process flow diagrams of FIGS. 7 and 8. FIG. 7 indicates a standard mode usage scenario in view of a system error or other problem. In FIG. 7 the system starts by booting into a first snapshot at block 301. This is typically the default or primary snapshot and may or may not be selected by the user. At some point during the user of the system an error occurs at block 303. Accordingly, to recover the system, the user commands a restart at block 305. This can be done using menu commands, or in more severe circumstances, by switching off the power and then restoring system power.

At block 307, the system accordingly shuts down and at block 309 it starts to reboot. At block 311, however, the boot is intercepted by the interception machine code as described above. An alternate snapshot, for example, the secondary snapshot is selected at block 313. This can be done in any of the way described above, including an arrow selection on a splash screen, remote administrator intervention, or automatically, among others. With the second snapshot selected, the system, at block 315, boots into the secondary snapshot. It is now in a functional clean operational state based on the clean secondary snapshot. At this state, the process flow can end with the system fully functional. However if the secondary snapshot is corrupted or experiences an error, then there may be no other backup to allow the system to be recovered. The system can be restored in any of a variety of different ways as described herein.

Using the recovery system of the present invention, in one example, the system can be restored using the high level recovery software. In this example, at block 317, the first snapshot is reverted to a prior state. This can be done using a stored reference baseline, an external reference, or the active second snapshot. After the first snapshot is reverted to a safe state, the system can then be rebooted into the first snapshot. This keeps the second snapshot hidden and protected in the event of another system error.

At block 319, a restart command is issued. The system shuts down at block 321. The reboot is started at block 323, which is then intercepted as before at block 324. The first snapshot is now selected at block 327 and the system at block 329 is booted into the first snapshot. All of these operations can be performed manually or can be activated and automated using the high level software and resetting the default snapshot in the interception machine code.

FIG. 8 show an example operation flow for a system using the freeze mode described above. In the freeze mode, the system alternates between two snapshots at each reboot, ensuring that all system changes since the last reboot are eliminated. A block 351, the system starts to boot. At block 353, the boot is intercepted and at block 355, the default snapshot is selected. At block 357, the system boots into the default snapshot. The system is now running and operational in the default snapshot.

At block 359, the active snapshot is the default snapshot. This may either be the primary or the secondary as described in the examples above. At block 359, the inactive snapshot is restored to the condition of the newly booted active snapshot and at block 361, the inactive snapshot becomes the default snapshot.

At block 363 a restart is commanded. This may be because of some system error or failure, a power outage, or as a routine part of operating the system. As in FIG. 7, the restart may occur by user command to the operating system or by pressing a power button on the hardware. However, it occurs, at block 365, the system shuts down. The process then returns to block 351. When the system boot into the default snapshot, the default has switched to the other snapshot which was restored immediately after the last boot. Accordingly, the machine is in the same state as it was the last time it was booted, regardless of any events that may have occurred during its operation.

In one example, the operations of blocks 359 and 361 are performed before the user is granted access to the system. These operations are then programmed to proceed automatically without the risk of user operation. These two operations ensure that the default snapshot is in a secure state and the freeze mode operates to reverse any changes made since the last reboot.

The freeze mode also permits the system to be updated while it is booted into either snapshot. For example, after the system is booted into, for example, the primary snapshot, the secondary snapshot can be modified. Since the secondary is the default for the next reboot, the modification will be adopted after the next reboot. In addition, the modification will be copied into the primary snapshot. Replacing the inactive snapshot provides an efficient way to upload a new image to many machines.

Figure 9:
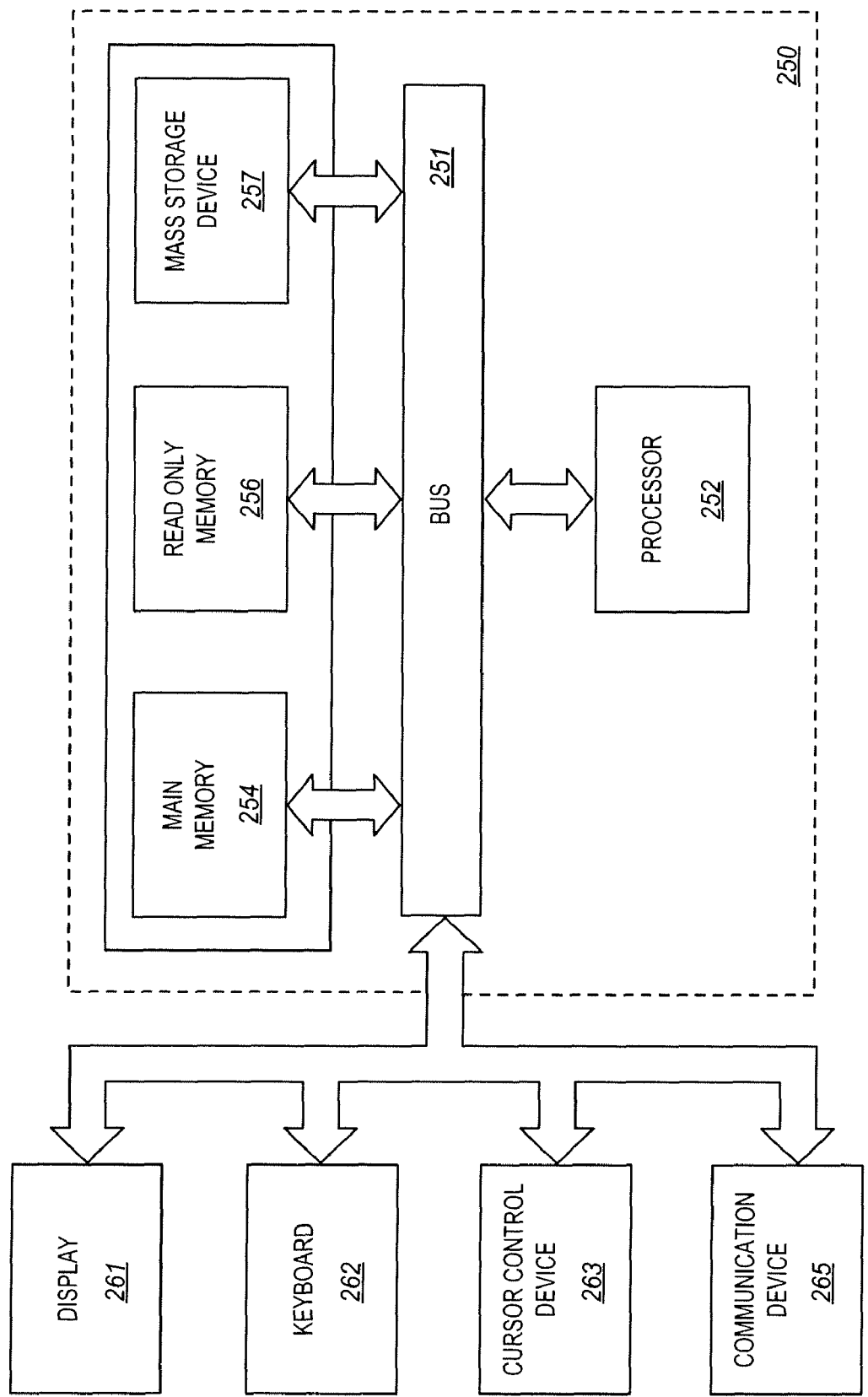
FIG. 9 is a block diagram of a computer system suitable for use with embodiment of the present invention.

A computer system 250 representing an example of a system upon which features of the present invention may be implemented is shown in FIG. 9. The booting from snapshots as well as the remote maintenance may be performed on a system such as that shown in FIG. 7. While a computer system is shown, mobile network devices, portable communication devices, entertainment set-top boxes and other devices may take a similar form. This hardware configuration is shown as an example only and a variety of other configurations may be used instead. The computer system 250 includes a bus or other communication conduit 251 for communicating information, and a processing means such as a microprocessor, controller, or DSP (digital signal processor) 252 coupled with the bus 251 for processing information. The disks of FIGS. 1 and 2 may be implemented as the mass storage in this device, or in associated external mass storage.

The computer system 250 further includes a main memory 254, such as a random access memory (RAM) or other dynamic data storage device, coupled to the bus 251 for storing information and instructions to be executed by the processor 252. The main memory also may be used for storing temporary variables or other intermediate information during execution of instructions by the processor. The main memory may be implemented as a separate device as shown or integrated with the processor in a single chip.

The computer system may also include a nonvolatile memory 256, such as a read only memory (ROM) or other static data storage device coupled to the bus for storing static information and instructions for the processor including the BIOS. A mass memory 257 such as a magnetic disk or optical disc and its corresponding drive may also be coupled to the bus of the computer system for storing information and instructions. The NVRAM and mass memory may also be incorporated into the processor as a single chip.

The computer system can also be coupled via the bus to a display device or monitor 261, such as a Liquid Crystal Display (LCD), for displaying information to a user. In addition to video, graphical and textual indications of installation status, operations status and other information may be presented to the user on the display device. Typically, an alphanumeric input device 262, such as a keyboard with alphanumeric, function and other keys, or a remote control may be coupled to the bus for communicating information and command selections to the processor. A cursor control input device 263, such as a mouse, a trackball, or cursor direction keys can be coupled to the bus for communicating direction information and command selections to the processor and to control cursor movement on the display 261.

A communication device 265 is also coupled to the bus 251. The communication device 265 may include a modem, a network interface card, or other well known interface devices, such as those used for coupling to Ethernet, token ring, or other types of physical attachment for purposes of providing a communication link to support a local or wide area network (LAN or WAN), for example. In this manner, the computer system may also be coupled to a number of clients or servers via a conventional network infrastructure, including an intranet or the Internet, for example. Further or alternative communication interfaces may be provided for other types of buses, such as USB (Universal Serial Bus), Firewire (i.Link or IEEE1394), or various wireless interfaces.

A lesser or more equipped computer system than the example described above may be preferred for certain implementations. Therefore, the configuration of the exemplary computer system 250 will vary from implementation to implementation depending upon numerous factors, such as price constraints, performance requirements, technological improvements, or other circumstances. The particular nature of any attached devices may be adapted to the intended use of the device. Any one or more of the devices, buses, or interconnects may be eliminated from this system and others may be added.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various steps. The steps of the present invention may be performed by hardware components, such as those shown in the Figures, or may be embodied in machine-executable instructions, which may be used to cause general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program an agent or a computer system to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of machine-readable media suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatus are described in their most basic form but steps may be added to or deleted from any of the methods and components may be added or subtracted from any of the described apparatus without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

What is claimed is:

1. A method comprising:
   initiating a start-up sequence of a computer system;
   identifying a plurality of snapshots in a single file system in a hidden section of a mass storage device before loading an operating system for the computer system, each snapshot being completely independent of the last active snapshot and containing an independent bootable image of a system drive with an operating system, applications, and computer system configuration settings;
   exposing one of the plurality of snapshots if it is hidden;
   booting the exposed snapshot including loading the operating system and applications of the exposed snapshot;
   completing the start-up sequence; and
   replacing the registry of the operating system of one of the plurality of snapshots that was not booted with the registry of the snapshot that was booted, wherein replacing comprises comparing and then overwriting and deleting files that are not present in the registry of the snapshot that was booted.

2. The method of claim 1, further comprising selecting one of the plurality of snapshots after identifying the plurality of snapshots and before loading an operating system and wherein exposing comprises exposing the selected snapshot.

3. The method of claim 2, wherein selecting comprises accessing a stored selection.

4. The method of claim 2, wherein selecting comprises receiving a selection from a user.

5. The method of claim 4, further comprising determining names and locations of each of the plurality of snapshots and presenting a list of the snapshot names to a user before receiving a selection.

6. The method of claim 5, further comprising receiving authentication from a user and wherein presenting comprises restricting the list of snapshot names based on the received authentication.

7. The method of claim 4, further comprising receiving authentication from the user associated with the selected snapshot before booting.

8. The method of claim 1, further comprising enabling access to anchored data files in a visible portion of the mass storage device after completing the start-up sequence.

9. The method of claim 1, further comprising loading shortcuts to user data files that are stored in a visible section of the mass storage device.

10. The method of claim 1, wherein the snapshot includes user data files.

11. The method of claim 1, wherein loading the operating system further comprises receiving authentication from the user for the operating system.

12. The method of claim 1, wherein the snapshot comprises user configuration files.

13. The method of claim 1, further comprising:
   shutting down the computer system after completing the start-up sequence;
   initiating a second start-up sequence;
   exposing a different one of the plurality of snapshots;
   booting the exposed snapshot;
   completing the start-up sequence; and
   replacing the registry of the operating system of the previously booted snapshot.

14. A method comprising:
   saving a computer system configuration as a snapshot in a hidden portion of a mass storage device of the computer system, the snapshot being one of a plurality of snapshots in a single file system in a hidden portion of the mass storage device, each snapshot being completely independent of each other snapshot and including an operating system, applications, and system configuration settings;
   identifying the saved configuration in a boot record of the computer system;
   designating one of the plurality of snapshots as a default snapshot in the boot record; and
   replacing the registry of the operating system of one of the plurality of snapshots with the registry of another snapshot, wherein replacing comprises comparing and then overwriting and deleting files that are not present in the registry of the one snapshot but are present in the another snapshot.

15. The method of claim 14, further comprising configuring a computer system in operation, and wherein saving the configuration comprises saving the configuration resulting from configuring the computer system in operation.

16. The method of claim 14, wherein the computer system configuration is retrieved from an external storage device.

17. The method of claim 14, further comprising:
   rebooting the computer system into the saved configuration; and
   modifying another one of the snapshots based on the saved configuration.

18. A non-transitory tangible machine readable medium having instructions stored thereon, that when executed by a computer, causes the computer to perform operations comprising:
   initiating a start-up sequence of a computer system;
   identifying a plurality of snapshots in a single file system in a hidden section of a mass storage device before loading an operating system for the computer system, each snapshot being completely independent of the last active snapshot and containing an independent bootable image of a system drive with an operating system, applications, and computer system configuration settings;
   exposing one of the plurality of snapshots if it is hidden;
   booting the exposed snapshot including loading the operating system and applications of the exposed snapshot;

completing the start-up sequence; and replacing the registry of the operating system of one of the plurality of snapshots that was not booted with the registry of the snapshot that was booted, wherein replacing comprises comparing and then overwriting and deleting files that are not present in the registry of the snapshot that was booted.

19. A computer system comprising:

a plurality of snapshots in a single file system in a hidden section of a mass storage device, each snapshot being completely independent of the last active snapshot and containing an independent bootable image of a system drive with an operating system, applications, and computer system configuration settings;

a boot loader to start up the computer system:

an interception machine code to interrupt the boot loader to expose one of the plurality of snapshots if it is hidden and to cause the boot loader to load the exposed snapshot including loading the operating system and applications of the one snapshot; and a processor to replace the registry of the operating system of one of the plurality of snapshots that was not loaded with the registry of the snapshot that was loaded, wherein replacing comprises comparing and then overwriting and deleting files that are not present in the registry of the snapshot that was loaded.

20. The computer system of claim 19, further comprising a user interface to receive a selection of one of the plurality of snapshots from a user, the selected snapshot being the one snapshot that is loaded.

21. A computer system comprising:

a plurality of snapshots in a single file system in a hidden section of a mass storage device of a computer system, each snapshot being completely independent of the last active snapshot and containing an independent bootable image of a system drive with an operating system, applications, and computer system configuration settings;

an indicator presented on a display of the computer system to display which one of the plurality of snapshots is selected;

a plurality of selection indicators presented on the display, the indicators each being connected to one of the plurality of snapshots, each indicator upon being selected by a user, to command the computer system to boot the connected snapshot, including loading the operating system and applications of the selected snapshot by interrupting a boot loader and exposing a snapshot before an operating system is loaded; and a processor to replacing the registry of the operating system of one of the plurality of snapshots that was not booted with the registry of the snapshot that was booted, wherein replacing comprises comparing and then overwriting and deleting files that are not present in the registry of the snapshot that was booted.

* * * * *